United States Patent [19]
El Bindari

[11] 3,840,972
[45] Oct. 15, 1974

[54] METHOD FOR INSERTING RODS INTO COILED TUBES
[75] Inventor: Ahmed El Bindari, Brookline, Mass.
[73] Assignee: Clad Metals Corporation, Boston, Mass.
[22] Filed: July 31, 1973
[21] Appl. No.: 384,249

Related U.S. Application Data
[62] Division of Ser. No. 216,499, Jan. 10, 1972, Pat. No. 3,778,878.

[52] U.S. Cl............... 29/433, 29/241, 29/423
[51] Int. Cl............................. B23p 19/04
[58] Field of Search.......... 29/433, 200 R, 241, 244, 29/421, 423; 15/104.06 R, 104.05, 104.16; 137/560; 254/134.4, 134.3 FT

[56] References Cited
UNITED STATES PATENTS

| | | | |
|---|---|---|---|
| 105,015 | 7/1870 | Van Slooten et al. ... | 15/104.06 R X |
| 526,141 | 9/1894 | Bloomer ............................. | 29/433 |
| 646,545 | 4/1900 | Novotny...................... | 15/104.06 R |
| 2,246,056 | 6/1941 | McKenzie........................ | 15/104.3 |
| 2,794,197 | 6/1957 | Crane........................... | 15/104.06 R |
| 2,869,226 | 1/1959 | Schurman............................ | 29/421 |
| 2,980,399 | 4/1961 | Littlefield ...................... | 254/134.4 |
| 3,120,947 | 2/1964 | Hamrick .................. | 15/104.06 R X |
| 3,179,375 | 4/1965 | Hamrick .................. | 15/104.06 R X |
| 3,547,406 | 12/1970 | Bielstein ........................ | 254/134.4 |

*Primary Examiner*—Charles W. Lanham
*Assistant Examiner*—Victor A. DiPalma
*Attorney, Agent, or Firm*—Kenway & Jenney

[57] ABSTRACT

A flexible rod is attached to a spherical piston and inserted into a coiled hollow conduit through a sealed junction at one end of the conduit. The outside diameter of the rod is less than the inside diameter of the conduit and a slight clearance exists between the piston and the conduit. Pressurized fluid is introduced into the conduit at the sealed junction behind the piston. The fluid presses against the piston, thereby exerting force on the rod and the rod is simultaneously pushed from outside the junction. The fluid also acts as a lubricant between the rod and the conduit and the piston and the conduit. Because the fluid is flowing through the conduit it provides dynamic lubrication of the rod. In this manner the rod can be inserted many angular turns past the total angular distance normally computed using the equation for the "capstan effect" for the case of simply pushing a rod into a coiled hollow conduit. It is thus practical, from a manufacturing standpoint, to insert long lengths of rods into coiled tubular members.

9 Claims, 3 Drawing Figures

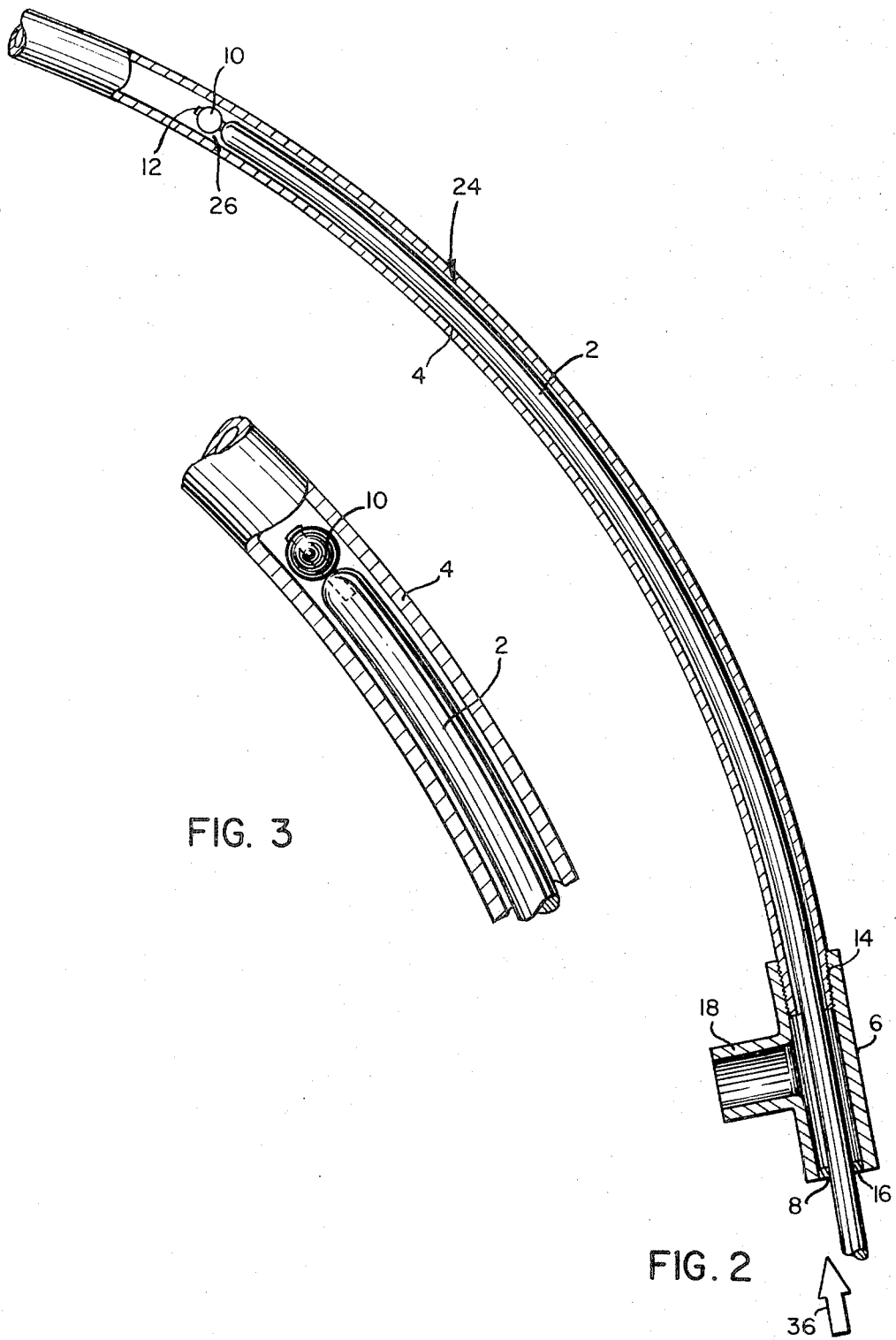

METHOD FOR INSERTING RODS INTO COILED TUBES

This application is a division of my pending application Ser. No. 216,499, filed Jan. 10, 1972 now U.S. Pat. No. 3,778,878, entitled, "Apparatus For Inserting Rods Into Coiled Tubes."

BACKGROUND OF THE INVENTION

My invention is useful in the manufacture of clad wire. Clad wire normally consists of two dissimilar metallic materials, formed in such a manner that one metal is completely encased by an outer cylinder formed of the other metal. There is a metallurgical bond between the two metals.

Heretofore, one method of making clad wire was to run a wire, under tension, through a molten homogeneous bath of a dissimilar metal. Very often this process had to be repeated several times. The wire introduced into the bath was coated by the molten metal as it passed through. This method is costly and requires precise controls to achieve the required coating and to avoid the possibilities of melting or relaxing and thereby thinning the core wire.

My invention eliminates the necessity of using a molten bath. According to the system described herein, a practical and economical apparatus and method for completely inserting a rod into a coiled hollow cladding conduit is now possible. The clad wire can then be formed by drawing the conduit containing the rod simultaneously through a reducing die by known methods.

The insertion of a rod into a conduit as a step in the forming of clad wire was heretofore impractical from a manufacturing standpoint. In order to form useful lengths of the conduit and rod compositions, (500 feet or more) in a reasonably sized manufacturing space, the rod must be inserted into a conduit, which is coiled. The length of rod that could be inserted into a coiled conduit was governed by the diameter of the coil, since a frictional effect, known as the capstan effect, prevented insertion beyond about four or five complete turns of the helical coil. According to the capstan equation, the frictional force opposing the insertion of the rod into a coiled conduit increases exponentially as the rod is inserted. The exponent in the capstan equation is directly proportional to the total angular distance through which the rod has been inserted. Accordingly, under typical conditions, the force required to insert a rod past a total angular distance of approximately $6\pi$ radians is extremely high and cannot be overcome by increasing the force exerted on the rod because of such practical limitations as rod buckling, coil expansion or conduit failure or rupture. As noted, the only way to increase the length of rod inserted into the conduit, was to increase the diameter of the coil by straightening the tube out. Neither of these solutions is satisfactory from a manufacturing standpoint, because in order to form useful lengths of rod and tube composites, either excessive manufacturing floor space or a very long room is required.

The following United States patents disclose various means for pulling a flexible member through a conduit by means of fluid pressure acting on a piston-like element:

Van Slooten et al. U.S. Pat. No. 105,015 patented July 5, 1870,

Novotny U.S. Pat. No. 646,545 patented Apr. 3, 1900,

Redmond Sr. U.S. Pat. No. 2,481,152 patented Sept. 6, 1949,

Brown U.S. Pat. No. 1,508,659 patented May 23, 1950,

Bailey U.S. Pat. No. 2,544,290 patented Mar. 6, 1951 and the

Hamrick U.S. Pat. No. 3,179,375 patented Apr. 20, 1965.

In terms of the capstan effect, it makes no difference whether the rod is inserted by pushing or pulling. Simply pulling on the rod does not eliminate the problem of the angular distance limitation on insertion. Simply lubricating the rod and conduit before inserting the rod into the conduit only causes an increase in the total angular distance, according to the capstan equation, past which the rod can no longer be pulled, as compared to the unlubricated case. If wire is to be made from the rod-conduit combination, the lubricant must be removed and such removal is difficult and expensive.

U.S. Pat. No. 524,507 issued Aug. 14, 1894 to Robertson discloses an apparatus for use in drawing metal rods etc. The patent discloses an apparatus that simultaneously pushes and pulls a metal blank through a drawing die. The metal blank is completely enclosed in a housing into which a fluid under pressure is introduced. The pressurized fluid pushes the rod through the drawing die. While the rod is being pushed by fluid pressure, the apparatus, as shown, can also exert a pulling force on the rod and both forces can act in conjunction. The patent also discloses that the die and blank may be lubricated.

The apparatus disclosed in the Robertson patent could not be used for inserting long lengths of rod into a long conduit which had been gathered into a helical coil. It would obviously be physically impossible to enclose the entire length of a rod with a length to diameter ratio say greatly in excess of 10 in a sealed housing and push upon it by fluid pressure and thereby drive it into the coiled conduit, while simultaneously exerting a pulling force on the rod by means of a tension member passed inside the coiled tube. The Robertson apparatus is practical only for inserting fairly short lengths of rod, which will not buckle when compressed by the driving fluid, through a short length of hollow tube. In addition, the Robertson patent is not directed to overcoming the additional frictional force created when a rod is inserted into a curved hollow conduit, known as the capstan effect.

It is an object of this invention to provide means for forming practical lengths of a rod and conduit composition, within the practical limits of a reasonably sized manufacturing space.

It is another object of this invention to overcome the angular distance insertion limitation created by the capstan effect, encountered when inserting rods into coiled conduit sections.

A further object of this invention is to provide for an improved bond between the conduit and rod, when extruded together to form a copper clad aluminum wire.

Another object of this invention is to enable high quality clad wire to be produced by means of a highly efficient manufacturing process, through replacement of one of the steps of the manufacturing process and apparatus used therein with this invention.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

SUMMARY OF INVENTION

As noted above, the invention provides a rod insertion system, suitable for inserting long lengths of flexible rods into curved conduit sections. A piston is attached to one end of the rod which is of slightly smaller outside diameter than the inside diameter of the conduit, into which the rod will be inserted. The outside diameter of the rod is less than the inside diameter of the conduit, into which it will be inserted. A junction is attached to one end of the conduit. The junction contains an inlet for fluid under pressure and an opening with a seal. This opending is sealed by the insertion of the rod through the opening, thereby preventing the escape of the pressurized fluid through it. The junction has another opening, which allows the rod to pass into the conduit as it is inserted through the junction. The piston, with the rod attached behind it, is inserted past the fluid inlet portion of the junction.

The rod is inserted into the conduit by the pulling force created by the piston on the rod and by the simultaneous exertion of a pushing force, external to the junction, in the direction of the conduit. The total angular distance through which the rod can be inserted is much greater than the angular distance through which the rod could be inserted by means of either an independent pushing or pulling action, which would itself be of a force equal to the maximum combined simultaneous pushing and pulling forces, exerted in the operation of the present invention. This comes about because the pressurized fluid, which exerts a force against the piston, also acts as a dynamic lubricant between the rod and conduit. The fluid also leaks or flows past the piston and thereby dynamically lubricates the piston and conduit contact surfaces. The driving fluid used can be a solvent, which will then clean both the rod and the conduit, thereby allowing a more perfect bond to form between them when they are drawn down together into clad wire. Thus clad wire of very high quality can be produced in a very practical and efficient manner.

BRIEF DESCRIPTION OF THE DRAWINGS

For a fuller understanding of the nature and objects of the invention, reference should be had to the following detailed description taken in connection with the accompanying drawings, in which:

FIGS. 2 and 3 are plan views, partly in section, of the apparatus illustrated in FIG. 1.

DETAILED DESCRIPTION OF INVENTION

Figure 1:
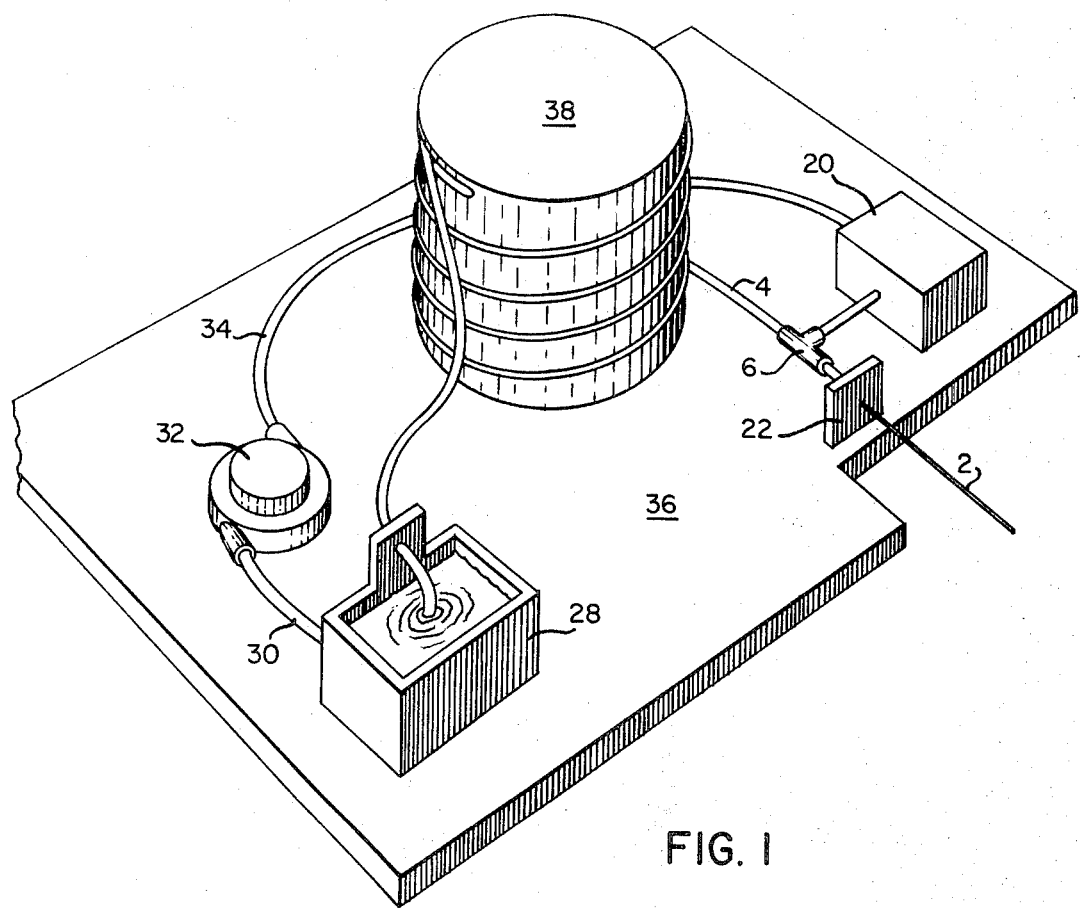
FIG. 1 is a pictorial of the apparatus embodying the invention.

FIG. 1 shows a coiled conduit 4 wound on a mandrel 38 which rests on a support 36. Rod 2 has been partially inserted into junction 6 and conduit 4. Fluid under pressure is supplied by the pump 20 to junction 6. At the other end of the conduit 4 is placed a reservoir 28 for supplying the fluid and collecting the fluid that flows through conduit 4. The fluid then passes through outlet pipe 30 into return pump 32 and then through return pipe 34 to pump 20. A feeder 22 is shown applying a pushing force to aid in the insertion of the rod 2. The feeder 22 can be a pair of counter-rotating sheaves which apply a frictional force to the rod 2 in the direction of insertion, which are driven by a frictional clutch. In a simpler mode of operation, the feeder 22 can be eliminated and a pushing force 13 applied by hand in the direction of insertion external to the junction.

FIG. 2 shows a section of the conduit 4 cutaway and exposing part of rod 2. A piston 10 is attached through attachment means 12 to one end of rod 2. The piston 10 is of slightly smaller outside diameter than the inside diameter of conduit 4. Therefore there is a slight clearance between the conduit 4 and piston 10 at point 26. I have found that the invention will operate with an average clearance of 0.0025 inches, between a piston 10 and the interior surface of conduit 4, with an inside diameter of 0.165 inches. The rod 2 is of a smaller outside diameter than the inside diameter of conduit 4. I have found that for a conduit 4 having an inside diameter at 0.165 inches, that I had no difficulty in inserting a rod with an outside diameter of 0.118 inches, which leaves an average clearance of 0.0235 inches between rod 2 and conduit 4. Normally the piston 10 is spherical and the inner surface of the conduit 4 and the exterior surface of the rod 2 are cylindrical in shape. I have also found it best to minimize the contact area between the rod 2 and the piston 10 and to use an attachment 12 having a smaller outside diameter than the outside diameter at the rod 2. In this manner the exposed surface area of the piston 10 facing towards the rod 2 is maximized. The conduit 3 is connected to the junction 6 at the opening 14. The junction 6 provides an inlet 18 for introduction of fluid under pressure into the junction. At the end of the junction, opposite the conduit, is an opening 16 in which is placed a flexible seal 8. The seal 8 prevents the escape of fluid through the opening 16 while the rod is being inserted. The rod is inserted in the direction shown by arrow 36.

The method of operation is as follows. The piston 10 is attached to one end of the rod 2. Rod 2 is coiled to the radius of curvature of the coiled conduit before insertion. This may be done by the counter-rotating sheaves previously mentioned which can be adjusted to provide the correct radius of curvature to the rod before insertion. The end of the rod 2, with the piston 10 attached to it, is inserted into opening 16 past the inlet 18. Fluid under pressure is then introduced through inlet 18 into the junction 6, behind piston 10. The fluid pressure is maintained at an approximately constant value. The fluid pushes on the piston 10 causing it to pull on the rod 2. Simultaneously a pushing force, external to the junction, is applied to the rod in the direction of arrow 36. The fluid can leak around the piston 10 if it is of a smaller distance diameter than the inside diameter of conduit 4. As the fluid passes around the piston 10 and the volume of fluid in the conduit 4 increases as the piston 10 progresses through the conduit 4, the pump 20 supplies additional fluid at an approximately constant pressure. The fluid that leaks past the piston 10 flows through the conduit 4 and is collected in reservoir 28 and from there is returned through outlet 30 by pump 32 through pipe 34 to pump 20. Obviously, if the fluid leaks past the piston, as it flows along the rod 2, a boundary layer forms along the rod. This flowing boundary layer maintains the rod centered in the conduit and out of contact with the conduit wall. Should the rod tend to engage the wall of the conduit, the flowing fluid will develop a force tending to center the rod in the tube and maintain it there. Thus the friction between rod and tube is essentially surrounded by flowing fluid.

The fluid used can also be a solvent, and it will therefore clean the interior surfaces of the conduit 4 and the surface of the rod 2. I have found that trichloromonofluoromethane performs remarkably well in this application. This product is sold by E. I. duPont deNemours and Co. under the trademark Freon-11. This material can readily be removed from the surfaces of the rod 2 and conduit 4 after insertion of the rod into the conduit by merely blowing warm air into the rod-conduit combination. When the rod 2 is fully inserted into conduit 4 and they are drawn down together, a more perfect untion or bond is formed between them, if the contact surfaces are clean which is accomplished by the Freon-11.

Referring to FIG. 3, the total angular distance of insertion of rod 2 into conduit 4 is measured from the center of piston 10. Heretofore, it has only been possible to insert a rod into a coiled conduit through a total angular distance of approximately $6\pi$ radians, when only a separate pushing or pulling force has been applied. The frictional force that opposes the motion of the rod inside a coiled conduit inserted in this manner is given by the following expression, known as the capstan equation:

$$T = T_o e^{\mu\theta}$$

where $T$ is the frictional force of opposition;
$T_o$ is a constant;
$\mu$ is the coefficient of friction between the rod and conduit; and
$\theta$ is the total angular distance through which the rod is inserted.

For value of $\mu$ between 0.1 and 0.3 (which are conventional for static lubrication) at a value of $\theta$ between about $8\pi$ and $10\pi$ radians it becomes physically impossible to overcome the frictional force opposing the motion of the rod without buckling. This force is created by the fact that the rod bears against the conduit as it is being inserted. As more of the rod is inserted the force necessary to overcome the frictional resistance increases and therefore the bearing force exerted by the rod on the conduit increases.

In the apparatus and procedures of my invention, as described above, I am able to exceed the limitation on the number of turns described above by essentially substantially reducing the value of $\mu$, the friction in my invention being merely that between the rod and the flowing fluid layer between the rod and the conduit. As described above, the flowing pressurized fluid tends to center the rod in the conduit.

Another secondary factor which tends to increase the achievable number of turns is that the rod is both pushed and pulled. If the rod is pushed, it exerts a bearing force outwardly from the center of the coil, and if it is pulled, it exerts a bearing force inwardly towards the center of the coil, on the conduit. According to my invention, the angular distance limitation imposed by either pushing or pulling on the rod is partially overcome by simultaneously pushing and pulling on the rod. If both forces are applied simultaneously the bearing forces tend to cancel each other along the length of the rod. If both forces are of equal magnitude, theoretically the rod will not bear on the conduit and the capstan effect would be completely eliminated. In reality it is almost impossible to entirely eliminate this effect, but it does tend to reduce it.

I have found it possible, using this invention, to insert a rod through an angular distance of $120\pi$ radians which is substantially greater than the limiting angular distance encountered when one merely uses static lubrication. While to date this is the longest coil into which I have inserted a rod, this value did not appear to be a limit.

This invention not only has application in the manufacture of clad wire, but in the construction of coaxial cables, concentric heat exchange tubes, multiple laminates and other areas where it is necessary to form lengths of concentric or laminated items.

Further, the insertion system as shown is of course not limited to inserting a solid cylindrical tube into a coiled or cylindrical conduit; this particular use is shown only by way of specific illustration. This invention has application in any instance where the conduit is placed in a non-linear arrangement.

It will thus be seen that the objects set forth above, among those made apparent from the preceding description, are efficiently attained and, since certain changes may be made in carrying out the above process and in the construction set forth without departing from the scope of the invention, it is intended that all matter contained in the anove description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The process of inserting a rod into a non-linearly arranged conduit comprising the steps of:
    partially introducing said rod into said conduit; causing pressurized fluid to flow in said conduit in the direction in which said rod is to be inserted; and
    pushing said rod externally of said conduit into said conduit, while said fluid flows therethrough.

2. The process according to claim 1 including the step of simultaneously pulling upon said rod from within said conduit.

3. The process of inserting a rod into a non-linearly arranged conduit comprising the steps of:
    connecting one end of said rod to a piston-like element; partially introducing the end of said rod with the piston-like element thereon into said conduit;

injecting a fluid under pressure behind said piston-like element, thereby causing said piston to pull upon said rod; and
    simultaneously pushing upon said rod externally of said conduit as said rod is pulled upon.

4. The process according to claim 3 including the steps of simultaneously lubricating said rod and conduit as said rod is inserted into said conduit.

5. The process of claim 3 including the step of simultaneously cleaning said rod and said conduit as said rod is inserted into said conduit.

6. The process according to claim 5 including the step of simultaneously lubricating said rod as said rod is inserted into said conduit.

7. The process according to claim 3 further comprising the step of collecting fluid passing through said conduit.

8. The process according to claim 3 further comprising the steps of:
   collecting fluid passing through said conduit; and
   returning said fluid for use in the step of injecting fluid under pressure into said conduit.

9. The process of claim 8 wherein said fluid is pressurized as it is returned for use in the step of injecting fluid under pressure into said conduit.

* * * * *